United States Patent
Ewald et al.

(10) Patent No.: US 12,103,413 B2
(45) Date of Patent: Oct. 1, 2024

(54) MOTOR VEHICLE WITH AN ELECTRICAL CONTACT-MAKING UNIT

(71) Applicant: Bayerische Motoren Werke Aktiengesellschaft, Munich (DE)

(72) Inventors: Alexander Ewald, Garching (DE); Bernhard Hoess, Munich (DE); Manfred Holzmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 503 days.

(21) Appl. No.: 17/427,997

(22) PCT Filed: Jan. 17, 2020

(86) PCT No.: PCT/EP2020/051118
§ 371 (c)(1),
(2) Date: Aug. 3, 2021

(87) PCT Pub. No.: WO2020/169281
PCT Pub. Date: Aug. 27, 2020

(65) Prior Publication Data
US 2022/0118865 A1    Apr. 21, 2022

(30) Foreign Application Priority Data
Feb. 18, 2019    (DE) .................. 10 2019 104 005.1

(51) Int. Cl.
*B60L 53/16*    (2019.01)
*B60L 53/35*    (2019.01)

(52) U.S. Cl.
CPC .............. *B60L 53/16* (2019.02); *B60L 53/35* (2019.02)

(58) Field of Classification Search
CPC ................................. B60L 53/16; B60L 53/35
See application file for complete search history.

(56) References Cited

U.S. PATENT DOCUMENTS 5,584,715 A * 12/1996 Ehrenfels ............... B60L 53/62
439/222
5,850,135 A    12/1998 Kuki et al.
(Continued)

FOREIGN PATENT DOCUMENTS

CN    203503887 U    3/2014
CN    205706219 U    11/2016
(Continued)

OTHER PUBLICATIONS

English translation of Chinese Office Action issued in Chinese Application No. 202080012282.0 dated May 5, 2023 (9 pages).
(Continued)

*Primary Examiner* — Robert Grant
(74) *Attorney, Agent, or Firm* — Crowell & Moring LLP

(57) ABSTRACT

A motor vehicle has an electrical contact-making unit, which is fixed to the vehicle, for making electrical contact with an external charging cable. The contact-making unit includes electrical contacts and a movable cover which can be moved between a protective position, in which the cover covers the electrical contacts and thereby protects them against soiling and/or water, and a charging position, in which the electrical contacts are accessible from the area surrounding the vehicle. The cover here is cuboidal and in the protective position it at least partially surrounds the electrical contacts. In the charging position, the cover is located next to the electrical contacts, wherein the cover can be moved between the charging position and the protective position in a manner operated by external force.

11 Claims, 5 Drawing Sheets

(56) References Cited

U.S. PATENT DOCUMENTS

| 8,384,344 B1 | 2/2013 | Rogers |
| 2021/0101493 A1 | 4/2021 | Ewald et al. |

FOREIGN PATENT DOCUMENTS

| CN | 109301591 A | 2/2019 |
| CN | 111902309 A | 11/2020 |
| DE | 697 14 879 T2 | 5/2003 |
| DE | 10 2012 104 986 A1 | 12/2012 |
| DE | 10 2013 214 205 A1 | 1/2015 |
| DE | 10 2015 214 781 A1 | 9/2016 |
| DE | 10 2015 206 715 A1 | 10/2016 |
| DE | 10 2018 205 594 A1 | 3/2019 |
| EP | 3 176 023 A1 | 6/2017 |
| EP | 3 176 024 A1 | 6/2017 |
| WO | WO 2019/060939 A1 | 4/2019 |

OTHER PUBLICATIONS

International Search Report (PCT/ISA/210) issued in PCT Application No. PCT/EP2020/051118 dated Apr. 30, 2020 with English translation (four (4) pages).

German-language Written Opinion (PCT/ISA/237) issued in PCT Application No. PCT/EP2020/051118 dated Apr. 30, 2020 (five (5) pages).

German-language Office Action issued in German Application No. 10 2019 104 005.1 dated Nov. 21, 2019 (five (5) pages).

* cited by examiner

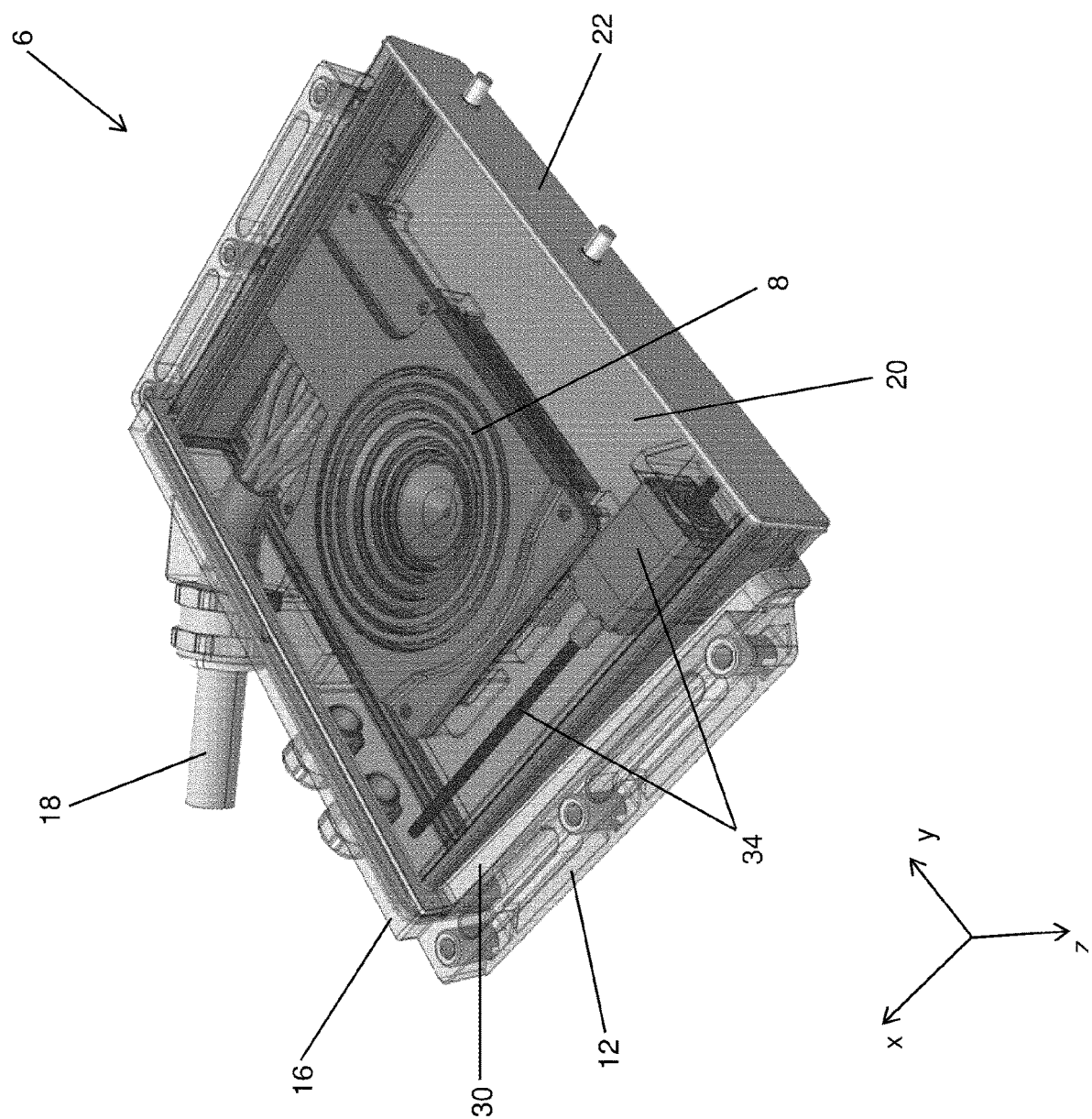

MOTOR VEHICLE WITH AN ELECTRICAL CONTACT-MAKING UNIT

BACKGROUND AND SUMMARY OF THE INVENTION invention relates to a motor vehicle having an electrical contacting unit which is fixed to the vehicle and which serves for the electrical contacting of an external charging cable.

Electric and plug-in hybrid vehicles offer the possibility of charging a battery of the vehicle at a conventional household plug socket, or at a charging pillar, with a charging cable. Said charging cable commonly comprises a plug connector, which has an interface to the household plug socket or to the charging pillar.

Such charging cables are commonly supplied with the corresponding vehicle by vehicle manufacturers and are accommodated for example in the luggage compartment. If a user wishes to charge the battery of the vehicle, they must remove the corresponding charging cable from the luggage compartment and connect this to the household plug socket or to the charging pillar and also open a corresponding flap on the vehicle in order to connect the charging cable to the corresponding charging socket of the vehicle. After the charging process, they must in turn remove the charging cable from the household plug socket or from the charging pillar and likewise remove the charging cable from the charging socket on the vehicle, and stow the charging cable in the luggage compartment again.

Disadvantages here are the relatively cumbersome handling of the charging cable and the associated time requirement. In particular in the case of a loaded luggage compartment, the removal of the charging cable is made additionally more difficult. Furthermore, the luggage compartment volume is reduced as a result of the accommodation of a charging cable.

To eliminate these disadvantages, it is known to use so-called charging robots or automated contacting systems which can automatically connect an electric or plug-in hybrid vehicle to the electrical grid for the purposes of charging the battery without the vehicle user having to manually themselves connect a charging cable.

For example, DE 697 14 879 T2 has disclosed an inductive charging system in the case of which a primary coil is moved into the immediate vicinity of a secondary coil on the motor vehicle, such that the battery of the motor vehicle can be inductively charged.

The company Volterio discloses, on its Internet homepage www.volterio.com, a charging robot which can move a conical plug connector to a plug socket on the vehicle in automated fashion and connect said plug connector to said plug socket, such that the battery of the vehicle can be conductively charged.

With the aid of such charging robots or automated contacting systems, a battery of an electric or plug-in hybrid vehicle can be charged without a vehicle user having to manually connect the vehicle to a charging pillar or charging plug socket. Here, the contacting of the vehicle is commonly performed on the vehicle underside, from below in a vehicle vertical direction. However, the vehicle underside in particular is particularly greatly exposed to spray water and dirt.

It is an object of the invention to create a motor vehicle having an electrical contacting unit with electrical contacts which are protected against contaminants and spray water.

Said object is achieved by means of a motor vehicle having an electrical contacting unit with according to the claimed invention.

According to embodiments of the invention, a motor vehicle has an electrical contacting unit which is fixed to the vehicle and which serves for the electrical contacting of an external charging cable. The contacting unit comprises at least electrical contacts and a displaceable cover which is displaceable between a protective position, in which it covers the electrical contacts and thus protects them against dirt and/or water, and a charging position, in which the electrical contacts are accessible from the vehicle surroundings. Here, the cover is cuboidal and, in the protective position, at least partially surrounds the electrical contacts. Here, cuboidal does not mean that the cover has to form a hollow body which is of encirclingly closed form. Rather, a cover in the form of a drawer, that is to say which is open on at least one side, has a cuboidal form. It thus suffices for the cover to be substantially cuboidal. This cuboidal form also encompasses embodiments in the case of which one or multiple walls are entirely or partially omitted. In the charging position, the cover is situated adjacent to the electrical contacts, wherein the cover is displaceable between the charging position and the protective position along at least one longitudinal guide in a manner driven by external power.

The cover preferably has at least one end side which is closed as viewed in the direction of the longitudinal guide and on which the drive engages for the purposes of displacing the cover. Ideally, the drive engages eccentrically on the closed end side. This arrangement has the advantage that the electrical contacting unit can have a particularly compact structural form. A centrally arranged drive duly makes it possible to use a single longitudinal guide for the cover, because the risk of jamming, misalignment and/or warping of the cover during the displacement is low, but the drive is imperatively arranged so as to engage centrally on the cover. Correspondingly, the electrical contacts must be arranged laterally adjacent to the drive in the electrical contacting unit. In this way, the electrical contacting unit and thus also the cover must imperatively be of relatively wide and thus large configuration. By contrast, the eccentric arrangement of the drive according to embodiments of the invention allows a particularly compact, asymmetrical design, because the drive can for example intentionally be arranged very close to a side wall of the cover. In this way, the dimensions of the electrical contacting unit can be kept particularly small.

It is advantageously the case that a reinforcement plate or a flexural beam is attached to the end side of the cover for the purposes of increasing the stiffness, which flexural beam reinforces the end side at least over a major part of the width extent of the end side. This prevents the possibility of the end side, and thus under some circumstances the cover as a whole, bending and/or warping, which could lead to jamming or misalignment of the cover in the at least one longitudinal guide. In particular in the case of a drive which engages eccentrically on the end side, the risk of warping, jamming or misalignment is particularly high. The use of a reinforcement plate or of a flexural beam can stiffen the cover such that warping, jamming or misalignment no longer occurs even in the case of an eccentrically engaging drive. For this purpose, the stiffening plate or the flexural beam may be formed from a particularly stiff material. For example, the reinforcement plate or the flexural beam may be composed of a metallic material, whereas the rest of the cover is implemented as a plastics component. Ideally, the reinforcement plate or the flexural beam is screwed by screws and/or riveted, to the end side of the cover at multiple locations. Screws and rivets are a very simple way of connecting two components to one another.

The drive is expediently an electrical spindle drive. Spindle drives are inexpensive and are particularly suitable for implementing a linear drive if relatively little structural space is available. They are thus predestined for the drive of the cover.

The drawings illustrate an exemplary embodiment of the invention, on the basis of which the invention will be described in more detail below. Each of the drawings is a schematic illustration.

BRIEF DESCRIPTION OF THE DRAWINGS

FIG. 5 is a perspective illustration of the contacting unit as a whole without the cover.

DETAILED DESCRIPTION OF THE DRAWINGS

Figure 1:
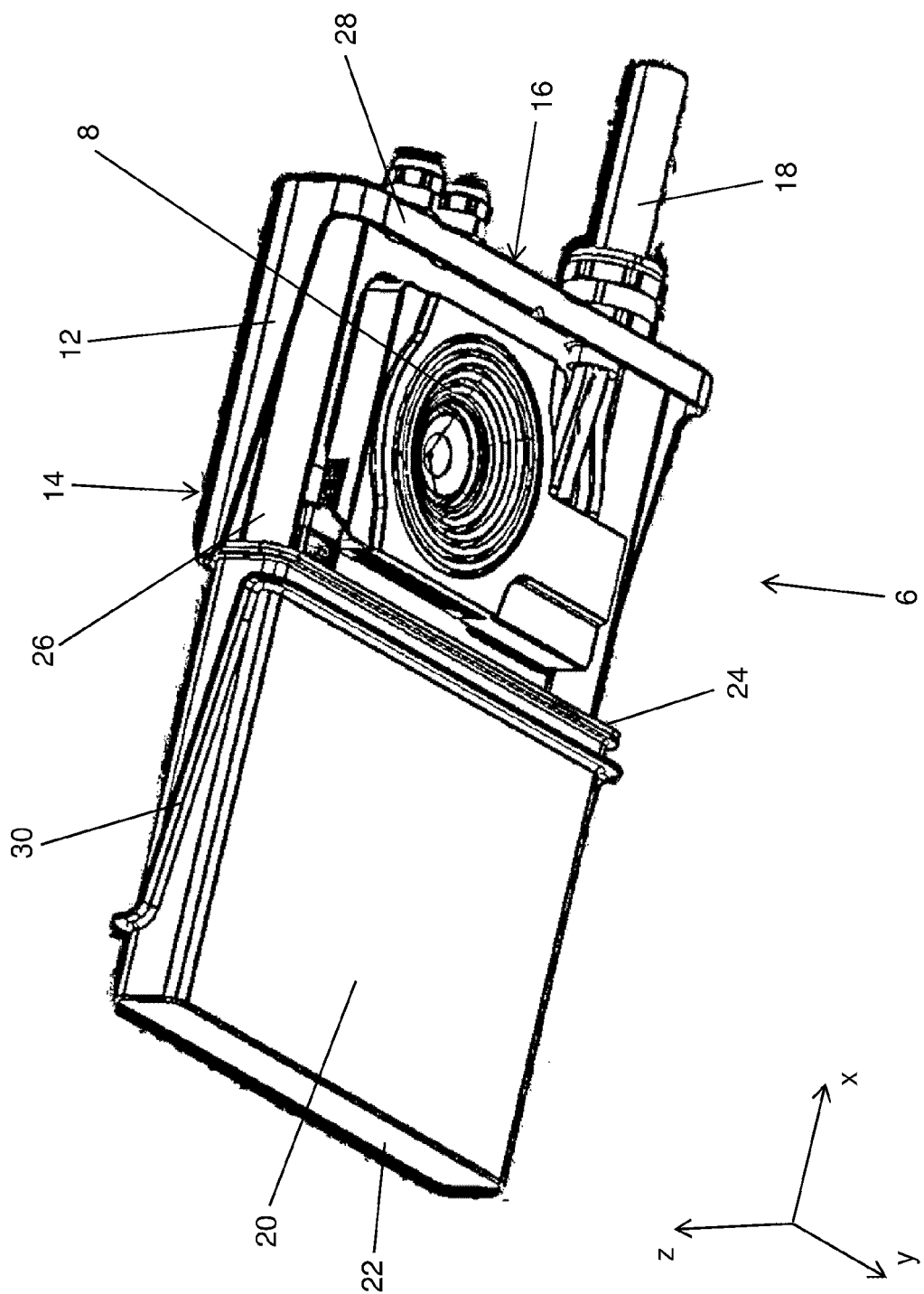
FIG. 1 shows a perspective view of a contacting unit on a vehicle for a charging robot, said contacting unit having a closable cover.
Figure 2:
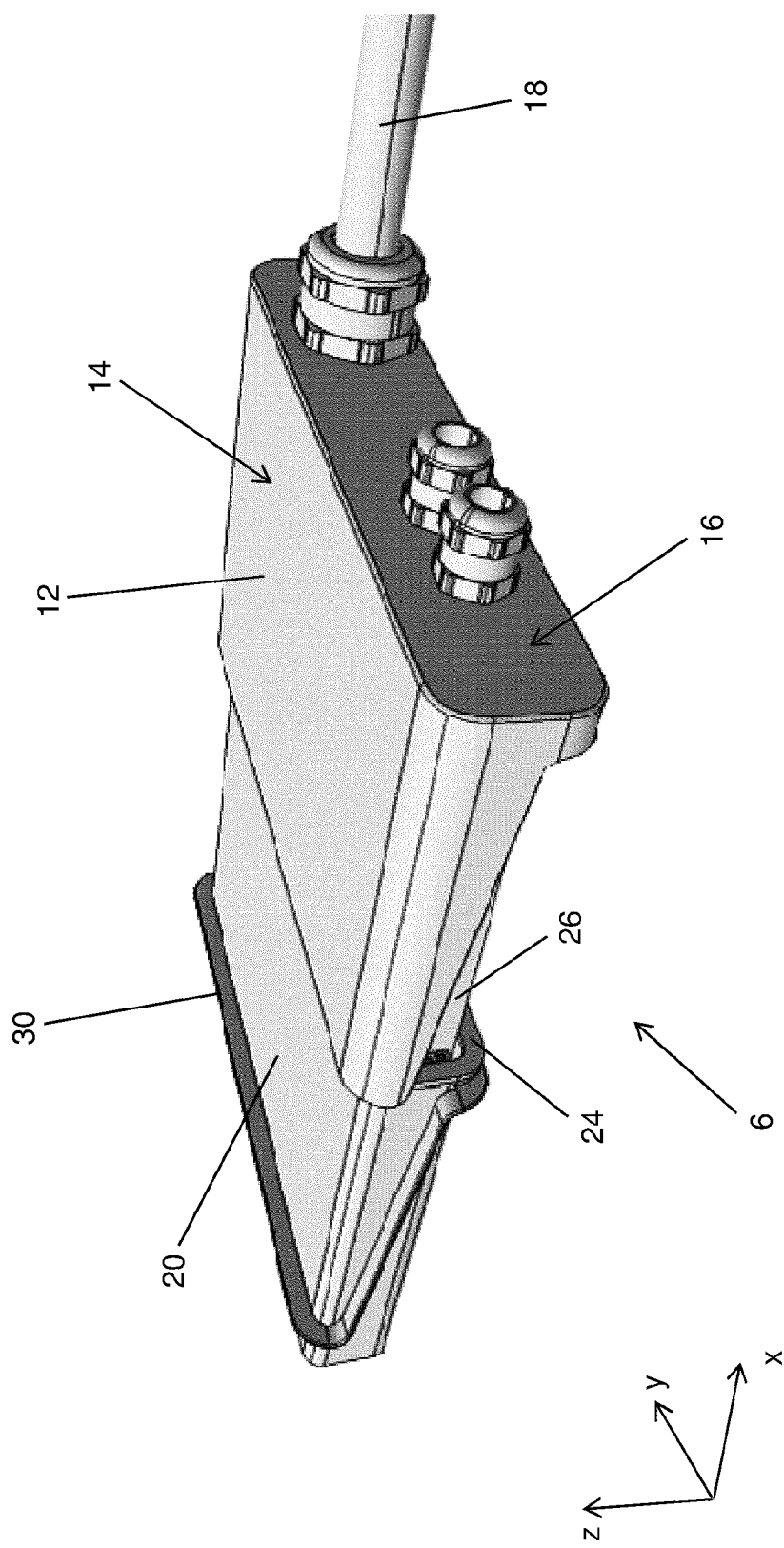
FIG. 2 shows a perspective view of the contacting unit on a vehicle, as illustrated in FIG. 1.
Figure 3:
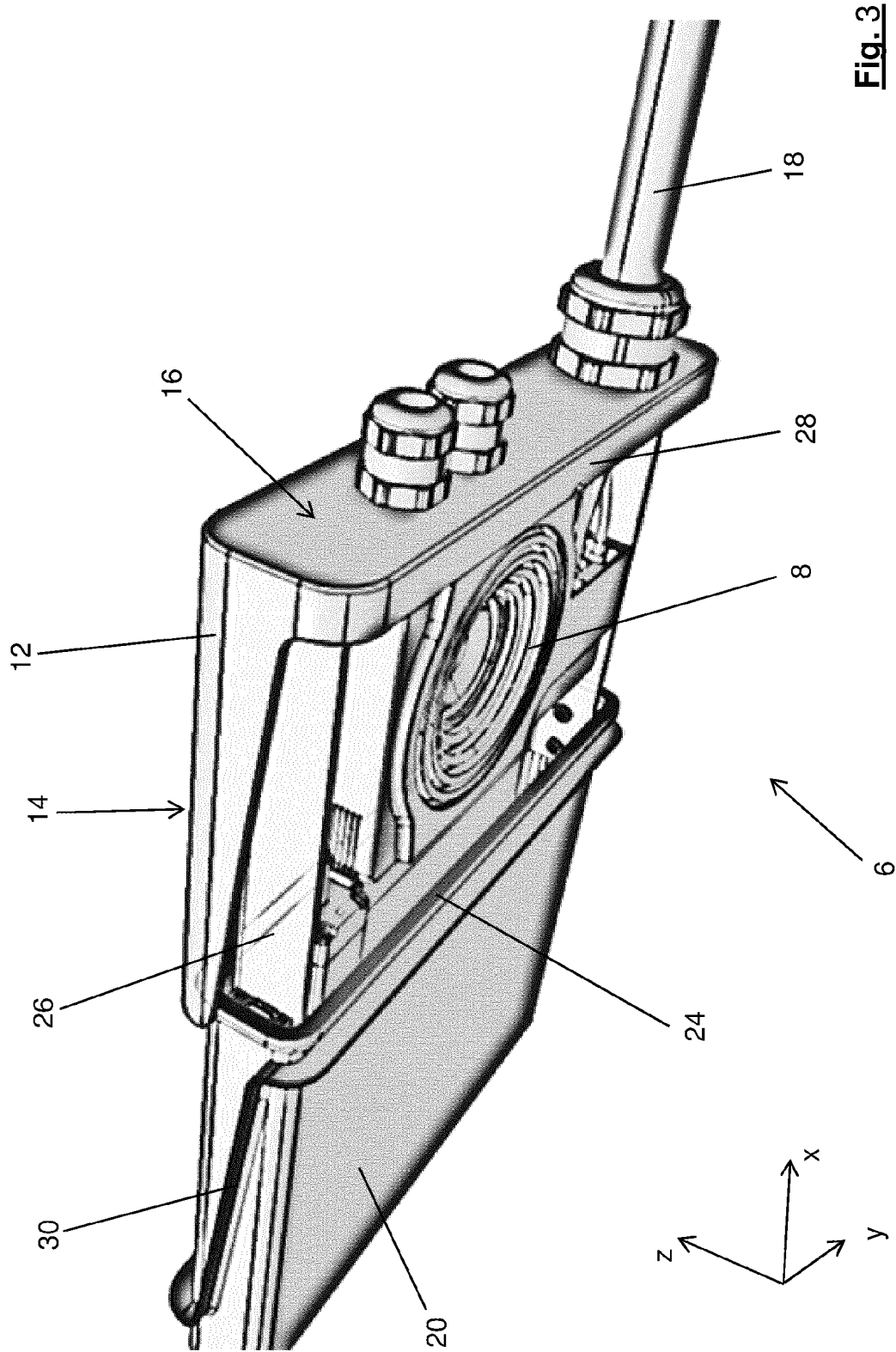
FIG. 3 shows a third perspective view of the contacting unit on a vehicle, as illustrated in FIG. 1.

FIGS. 1 to 3 show, from different viewing angles, the electrical contacting unit 6 which is attached to the underside of an electric or plug-in hybrid motor vehicle. The electrical contacting unit 6 has ring-shaped electrical contacts 8 which are arranged one inside the other and which have different diameters and which form a counterpart shape for a cone. Here, the cone widens downwardly in the vehicle vertical direction z, such that, for example, a charging robot can make contact from below in the vehicle vertical direction z in an effective manner. Here, the conical shape of the electrical contacts 8 allows simple centering of the counterpart.

The electrical contacting unit 6 has a main support 12 by way of which the electrical contacting unit 6 is attached to the underside, facing toward the ground, of the motor vehicle. The main support 12 comprises, inter alia, a planar mounting plate 14, by way of which the electrical contacting unit 6 is attached to the motor vehicle, and a receiving plate 16 which, at an edge region of the mounting plate 14, protrudes approximately perpendicularly therefrom downwardly in the vehicle vertical direction z. In the central region of the receiving plate 16, the electrical contacts 8 are connected in a laterally protruding manner. From the electrical contacts 8, a cable 18 runs through the receiving plate 16 to the battery for charging.

For the automatic contacting of the charging cable with the electrical contacting unit 6 for example by way of a charging robot, the electrical contacts 8 must be freely accessible from below in the vehicle vertical direction z, as shown in FIGS. 1 to 3. By contrast, during travel, the electrical contacts 8 would become wet and dirty. Furthermore, they could be mechanically damaged for example as a result of stone impact. The electrical contacts 8 must therefore be protected by way of a cover 20 during travel.

The cover 20 is composed of an elongate, rectangular hollow body with a flat, rectangular cross section. Here, the edges are of rounded design. The front end side 22 of the cover as viewed in the vehicle longitudinal direction x is closed, whereas the rear end side is open. The rear end side has an outwardly protruding encircling collar, to which there is applied an encircling seal 24 which faces toward the receiving plate 16.

The cover 20 is displaceable in translational fashion in a vehicle longitudinal direction x between a charging position and a protective position. In the charging position shown in FIGS. 1 to 3, the cover 20 is situated in front of the electrical contacts 8 as viewed in the vehicle longitudinal direction x. In the protective position, the cover 20 has been moved rearward in the vehicle longitudinal direction x, such that the electrical contacts 8 are situated in the cavity of the cover 20. In the protective position of the cover 20, the seal 24 bears sealingly in encircling fashion against the receiving plate 16. Thus, in the protective position of the cover 20, the electrical contacts 8 are protected from all sides. At the front, and around the electrical contacts 8, the cover 20 itself provides the protection, whereas, at the rear as viewed in the vehicle longitudinal direction x, the covering plate 16 provides the required protection, which covering plate bears sealingly in encircling fashion against the rear end side or against the seal 24 on the rear end side of the cover 20. In this way, the electrical contacts 8 are, in the protective position, optimally protected against dirt and moisture.

In order to ensure controlled translational mobility of the cover 20, the main support 12 of the electrical contacting unit 6 has, on both sides, longitudinal guides 26 which guide the cover 20 in a defined manner in the vehicle longitudinal direction x. Additionally, the main support 12 has, around the covering plate 16, a web 28 which protrudes forward in the vehicle longitudinal direction x and which, in the protective position of the cover 20, protects the seal 24 against direct exposure to environmental influences, such that, for example, no dirty water can spray directly against the seal 24.

The cover 20 is moved, in a manner actuated by external power, by way of an electric spindle drive 34. Since the electrical contacting unit 6 is attached to the vehicle underside, it is not accessible, or is accessible only with extreme difficulty, to a vehicle user. Furthermore, it is the intention for the contacting of the charging cable to be performed automatically by way of the charging robot 2. It would therefore be counterproductive if the cover 20 first had to be moved manually from the protective position into the charging position. Therefore, the movement is performed by way of the electrical spindle drive 34, which converts its rotational movement into a longitudinal movement by way of a spindle. The corresponding switching signal for the actuation of the electrical spindle drive 34 may originate from a control unit which identifies that the battery of the motor vehicle is to be charged. This control unit may receive the signals required for this from the vehicle itself, which knows the present charging state of the battery, from the vehicle user and/or from a charging robot which can make contact with the electrical contacting unit 6.

Figure 4:
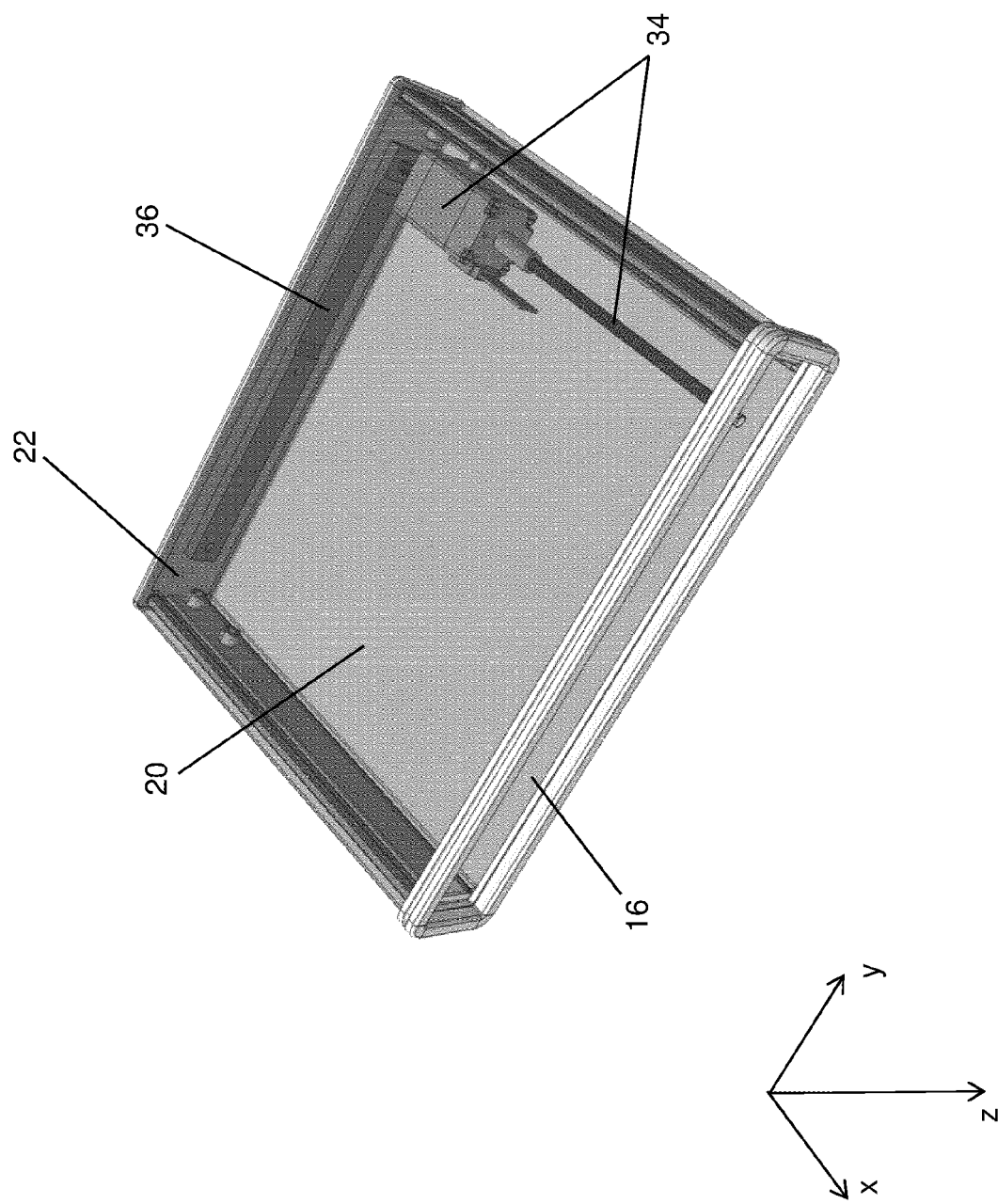
FIG. 4 is a perspective, schematic illustration of the contacting unit on a vehicle, as illustrated in FIG. 1, showing the position of an electric drive of the cover.

FIG. 4 shows a highly simplified perspective illustration of the cover 20 from below, the underside of which cover is illustrated in transparent form such that the interior of the cover 20 is visible. The cover 20 is situated in the closed position, such that it lies with the seal 24 on the rear end side against the illustrated cover plate 16 in encircling fashion. The spindle drive 34 extends in the vehicle longitudinal direction x directly adjacent to one of the two side walls of the cover 20. Owing to the lateral arrangement of the spindle drive 34, no otherwise required structural space is required in the central region of the cover 20 or of the electrical contacting unit 6, such that this eccentric arrangement of the spindle drive 30 is particularly space-saving. In this way, the cover 20 or the electrical contacting unit 6 can be of particularly compact design.

The spindle drive 34 is supported both on the cover plate 16 and on the closed front end side 22 of the cover 20. Here, the spindle drive 34 is supported on the lateral edge region of the front end side 22. The cover 20 is in the form of a plastics component. There is therefore the risk of the cover 20 warping owing to the spindle drive 34 which engages on the front end side 22 of the cover 20 in an extreme lateral position, such that, in the worst case, the cover 20 could become misaligned during the displacement in the longitudinal guides 26. It is therefore important to avoid possible warping of the cover 20 despite the spindle drive 34 which engages eccentrically on the front end side 22. In order to achieve this, the front end side 22 of the cover 20 is stiffened by way of a flexural beam 36. The flexural beam 36 extends in the vehicle transverse direction y over approximately the entire width of the front end wall 22. Said flexural beam is composed of a metallic material which is much stiffer than the front end wall 22 composed of plastic. The flexural beam 36 is screwed to the front end wall 22 at multiple locations over its longitudinal extent in the vehicle transverse direction y. Here, the electrical spindle drive 34 presses directly against the flexural beam 36 and thus against the front end side 22 of the cover 20. The provision of this flexural beam 36 is a simple and inexpensive way of eliminating the risk of warping of the cover 20 owing to the spindle drive 34 which engages on the front end side 22 in an extreme eccentric position.

FIG. 5 illustrates a perspective view of the electrical contacting unit 6 as a whole with the electrical spindle drive 34. It can be clearly seen how the electrical contacts 8 are arranged approximately centrally, and the electrical spindle drive 34 is attached in an extreme lateral position so as to take up as little structural space as possible. Owing to the flexural beam 36, no warping of the cover 20 occurs even in the event of an actuation of the spindle drive 34.

This embodiment according to the invention of electrical contacting unit 6 allows a very shallow and compact design which takes up little structural space.

LIST OF REFERENCE DESIGNATIONS

6 Contacting unit
8 Contacts
12 Main support
14 Mounting plate
16 Wall
18 Connection line
20 Cover
22 End side
24 Seal
26 Longitudinal guide
30 Web
32 Screw
34 Spindle drive
36 Flexural beam

What is claimed is:

1. A motor vehicle comprising:
an electrical contacting unit which is fixed to the vehicle and which serves for the electrical contacting of an external charging cable, wherein the contacting unit comprises:
electrical contacts; and
a displaceable cover, wherein:
the cover is displaceable between a protective position, in which the cover covers the electrical contacts and thus protects the electrical contacts against at least one of dirt or water, and a charging position, in which the electrical contacts are accessible from the vehicle surroundings,
the cover is cuboidal and, in the protective position, the electrical contacts are located in a cavity of the cover,
the cover, in the charging position, is situated adjacent to the electrical contacts,
the cover has a closed end side, and
the cover is displaceable between the charging position and the protective position along at least one longitudinal guide in a manner driven by external power by use of a drive.

2. The motor vehicle according to claim 1, wherein the drive engages on the end side of the cover for displacing the cover.

3. The motor vehicle according to claim 2, wherein the drive engages eccentrically on the end side of the cover for displacing the cover.

4. The motor vehicle according to claim 2, wherein:
a reinforcement plate or a flexural beam is attached to the end side of the cover for increasing stiffness, and
the flexural beam reinforces the end side at least over a major part of a width extent of the end side.

5. The motor vehicle according to claim 4, wherein the reinforcement plate or the flexural beam is at least one of screwed by screws, or riveted by rivets, to the end side of the cover at multiple locations.

6. The motor vehicle according to claim 1, wherein the drive is an electrical spindle drive.

7. The motor vehicle according to claim 1, wherein the electrical contacting unit has a main support which is connected to the motor vehicle and to which the electrical contacts are attached.

8. The motor vehicle according to claim 7, wherein:
a seal is attached to the main support, and
the cover bears sealingly against the seal in the protective position.

9. The motor vehicle according to claim 7, wherein:
a seal is attached in encircling fashion to the cover, and
the seal bears sealingly against the main support in the protective position.

10. The motor vehicle according to claim 9, wherein the seal is attached, in encircling fashion around the open end side, to the cover.

11. The motor vehicle according to claim 9, wherein the main support has a wall against which the seal bears in encircling fashion in the protective position of the cover.

\* \* \* \* \*